(12) United States Patent
Marsaut et al.

(10) Patent No.: US 10,260,941 B2
(45) Date of Patent: Apr. 16, 2019

(54) CHROMATIC CONFOCAL DISTANCE SENSOR

(71) Applicant: PRECITEC OPTRONIK GMBH, Neu-Isenburg (DE)

(72) Inventors: David Marsaut, Gréasque (FR); Martin Schönleber, Aschaffenburg (DE)

(73) Assignee: PRECITEC OPTRONIK GMBH, Neu-Isenburg (DE)

( * ) Notice: Subject to any disclaimer, the term of this patent is extended or adjusted under 35 U.S.C. 154(b) by 0 days.

(21) Appl. No.: 15/284,983

(22) Filed: Oct. 4, 2016

(65) Prior Publication Data

US 2018/0094975 A1    Apr. 5, 2018

(51) Int. Cl.
  *G01J 3/02*    (2006.01)
  *G01B 11/00*   (2006.01)
  *G01B 11/02*   (2006.01)

(52) U.S. Cl.
  CPC .......... *G01J 3/0256* (2013.01); *G01B 11/005* (2013.01); *G01B 11/026* (2013.01);
  (Continued)

(58) Field of Classification Search
  CPC ...... G01J 3/0256; G01J 3/0291; G01J 3/0286; G01J 3/0202; G01J 3/10; G01J 3/02;
  (Continued)

(56) References Cited

U.S. PATENT DOCUMENTS 3,013,467 A * 12/1961 Minsky ............... G02B 21/002
                                                    250/215
5,223,693 A *  6/1993 Zumoto ............... G03F 7/2006
                                                    219/121.68
(Continued)

FOREIGN PATENT DOCUMENTS

EP    1398597 A1    3/2004
EP    2667152 B1   11/2013
(Continued)

OTHER PUBLICATIONS

European Search Report dated Jan. 4, 2018.

*Primary Examiner* — Mohamed K Amara
(74) *Attorney, Agent, or Firm* — Lucas & Mercanti, LLP; Klaus P. Stoffel (57) ABSTRACT

A chromatic confocal distance sensor has a housing in which a polychromatic light source, imaging optics having a longitudinal chromatic aberration, a spectrometer and a planar beam splitter surface are arranged. These lie in the light path of the measurement light between the light source and the imaging optics and between the imaging optics and the spectrometer. A first diaphragm is arranged in the light path between the light source and the beam splitter surface, and a second diaphragm is arranged in the light path between the beam splitter surface and the spectrometer. The diaphragms are arranged mirror-symmetrically with respect to the beam splitter surface. The measurement light propagates as a free beam inside the housing. The beam splitter surface, the first diaphragm and the second diaphragm are fastened together (Continued)

on a carrier which has an isotropic thermal expansion coefficient. This way, temperature changes cannot significantly affect the measurement accuracy.

13 Claims, 3 Drawing Sheets

(52) U.S. Cl.
CPC .......... *G01J 3/0202* (2013.01); *G01J 3/0286* (2013.01); *G01J 3/0291* (2013.01); *G01B 2210/50* (2013.01)

(58) Field of Classification Search
CPC ........ G01J 3/021; G01J 3/0227; G01J 3/0237; G01J 3/06; G01J 3/4406; G01B 2210/50; G01B 11/24; G01B 11/026; G01B 21/047; G01B 9/02063; G01B 9/02091; G01B 11/005; G01B 11/007; G01B 11/03; G01B 11/0608; G01B 11/14; G01L 311/03; G01L 311/0608; G01L 311/14; G01N 21/6458; G01N 21/4795; G01N 21/6428; G01N 19/08; G01N 2021/4709; G01N 2021/656; G01N 21/47; G01N 21/6456; G01N 21/6486; G01N 21/9501; G01N 2201/06113; G02B 21/0064; G02B 21/0076; G02B 21/002; G02B 21/0032; G02B 21/0056; G02B 21/008; G02B 21/18; G02B 21/0024; G02B 21/0044; G02B 21/0084; G02B 21/26; G02B 21/34; G02B 5/04; G02F 1/353; G02F 1/365; G03F 7/70058; H04N 5/2254; H04N 5/2258
See application file for complete search history.

(56) References Cited

U.S. PATENT DOCUMENTS

| | | | | |
|---|---|---|---|---|
| 5,537,247 A * | 7/1996 | Xiao | ................. | G01N 21/6458 250/201.3 |
| 6,657,216 B1 * | 12/2003 | Poris | ................. | G01B 11/0608 250/216 |
| 7,042,556 B1 * | 5/2006 | Sun | ................. | G01N 21/21 356/237.1 |
| 7,071,477 B2 * | 7/2006 | Baer | ................. | A45D 26/0014 250/458.1 |
| 7,684,048 B2 * | 3/2010 | Meshulach | ........... | G01N 21/21 356/495 |
| 8,547,535 B2 * | 10/2013 | Tezuka | ............... | A61B 5/14532 250/201.3 |
| 9,185,357 B2 * | 11/2015 | Boccara | ............. | A61B 5/0066 |
| 2002/0044287 A1 | 4/2002 | Otaki | | |
| 2002/0141051 A1 * | 10/2002 | Vogt | ................... | G02B 21/0036 359/385 |
| 2003/0021020 A1 * | 1/2003 | Engelhardt | .......... | G02B 21/002 359/388 |
| 2004/0032651 A1 * | 2/2004 | Storz | ................. | G02B 21/0028 359/385 |
| 2004/0109170 A1 | 6/2004 | Schick | | |
| 2005/0128476 A1 * | 6/2005 | Zhao | ................. | G01J 3/44 356/301 |
| 2006/0033833 A1 * | 2/2006 | Hurwitz | ................. | G02B 1/10 348/340 |
| 2008/0239323 A1 * | 10/2008 | Sesko | ................. | G01B 11/026 356/614 |
| 2008/0309929 A1 * | 12/2008 | Christiansen | ........ | G01N 21/276 356/243.1 |
| 2010/0296106 A1 | 11/2010 | Gates | | |
| 2011/0072543 A1 * | 3/2011 | Redford | ............... | G02B 21/002 850/21 |
| 2011/0261472 A1 * | 10/2011 | Yamakawa | .......... | H04N 5/2254 359/715 |
| 2012/0188541 A1 * | 7/2012 | Demmer | ............... | G01J 3/0229 356/326 |
| 2013/0010283 A1 * | 1/2013 | Villiger | ................... | G01J 3/453 356/72 |
| 2013/0321906 A1 * | 12/2013 | Kriofske | ................ | G02B 27/00 359/363 |
| 2014/0295538 A1 * | 10/2014 | Franck | .................... | G01N 3/08 435/288.7 |
| 2015/0055215 A1 * | 2/2015 | Chen | .................. | G02B 21/0064 359/386 |
| 2015/0241200 A1 * | 8/2015 | Couweleers | ........ | G01B 9/02021 355/72 |
| 2015/0241275 A1 * | 8/2015 | Shibayama | ............ | G01J 3/0291 356/326 |
| 2017/0010218 A1 * | 1/2017 | He | ............ | G02F 1/172 |
| 2017/0310890 A1 * | 10/2017 | Wan | .................. | B29D 11/00307 |
| 2017/0350761 A1 * | 12/2017 | Varpula | .................... | G01J 3/26 |

FOREIGN PATENT DOCUMENTS

| | | |
|---|---|---|
| FR | 2930334 A1 | 10/2009 |
| FR | 2950441 B | 3/2011 |
| JP | H047502 A | 1/1992 |

\* cited by examiner

CHROMATIC CONFOCAL DISTANCE SENSOR

BACKGROUND OF THE INVENTION

1. Field of the Invention

The invention relates to a chromatic confocal distance sensor, in which the light source, the imaging optics and the spectrometer are arranged in the same housing. With corresponding miniaturization of the individual modules, such a distance sensor can have dimensions so small, and be so lightweight, that it can be fastened on a holder of a coordinate measuring machine (CMM).

2. Description of the Prior Art

Chromatic confocal distance sensors have been used for many years in industrial metrology when distances to object surfaces need to be measured contactlessly and with high accuracy. In the case of transparent objects, it is also possible to measure wall thicknesses or other thicknesses since, in general, it is possible to measure a distance for each optical interface and the thickness is obtained as the difference between the measured distances.

Chromatic confocal distance sensors contain a light source, which generates polychromatic measurement light and directs it onto a diaphragm. In this context, a diaphragm is intended to mean any small opening from which light can emerge and which it can optionally also enter again. The diaphragm is imaged by imaging optics onto the surface to be measured. At least a part of the imaging optics has a significant longitudinal chromatic aberration. Differently colored images of the diaphragm are therefore arranged successively on the optical axis of the imaging optics. Only the spectral component of the measurement light for which the image of the diaphragm lies precisely on the surface to be measured is reflected back by the latter in such a way that it can enter the same diaphragm or a diaphragm arranged optically conjugate therewith. The wavelength of this spectral component is recorded with the aid of a spectrometer. Each wavelength is in this case assigned a particular distance from the imaging optics. Although the other spectral components are likewise partially reflected by the object surface, they cannot however be focused by the imaging optics into the same diaphragm or a diaphragm optically conjugate therewith, and therefore do not contribute significantly to the part of the measurement light which is spectrally analyzed by the spectrometer.

EP 2 667 152 B1 discloses a chromatic confocal distance sensor which can be fastened by means of an automatic changeable coupling to a holder of a coordinate measuring machine (CMM). With coordinate measuring machines, the spatial coordinates of an object can be determined with high accuracy. Usually, coordinate measuring machines comprise a tactile measurement head which is moved with the aid of a displacement system towards the object to be measured. The displacement paths are in this case recorded with high accuracy with the aid of displacement or angle sensors. Compared with tactile sensors, optical distance sensors have, inter alia, the advantage that the measurement is carried out contactlessly and even very sensitive or contaminated surfaces can therefore be measured without problems.

In order to be able to be fastened replaceably on a coordinate measuring machine, a chromatic confocal distance sensor must satisfy certain requirements which do not exist with conventional sensors of this design. For instance, such a distance sensor must be very small and lightweight so that it can be carried by the holders of the coordinate measuring machine which are configured for the fastening of tactile sensors. The total volume of the distance sensor should ideally be less than about 350 cm$^3$, and the weight less than about 500 g (compared with this, conventional tactile sensors often only have a volume of less than 20 cm$^3$ and a weight of less than 100 g). The small installation space also entails problems with regard to the heat management. Since a sizeable part of the electrical power received by the light source and the spectrometer is converted into heat inside the housing, the measurement accuracy may be impaired by thermally induced deformations.

Furthermore, the spectrometer, the imaging optics and the light source should be arranged in the same housing so that the measurement light does not need to be guided by an additional optical fiber to modules arranged outside the housing. Such a fiber has to be fed in particular through the automatic changeable coupling of the coordinate measuring machine, for which the latter is not standardly configured.

The distance sensor known from the aforementioned EP 2 667 152 B1 does not unconditionally satisfy these requirements. Since the measurement light is guided in optical fibers, which (above all in the region of fiber couplers) cannot be curved arbitrarily greatly, the distance sensor is so large and heavy that it cannot be coupled to all coordinate measuring machines.

FR 2930334 A1 and FR 2950441 B disclose chromatic confocal distance sensors in which the measurement light passes as a free beam through a beam splitter. A free beam is intended to mean a light beam which is not guided in an optical fiber or another optical waveguide. In these known distance sensors, the light source and the spectrometer are connected via optical fibers to a measurement head, which contains the free-beam beam splitter and the imaging optics. These distance sensors cannot therefore be coupled automatically to coordinate measuring machines.

SUMMARY OF THE INVENTION

The object of the invention is to provide a chromatic confocal distance sensor which has a high measurement accuracy, but which is so small and lightweight that it can be fastened on the holder of a coordinate measuring machine if required.

This object is achieved according to the invention by a chromatic confocal distance sensor which has a housing. A light source, which is configured in order to generate polychromatic measurement light, is arranged in the housing. Also arranged in the housing are imaging optics, which have a longitudinal chromatic aberration, a spectrometer, and a planar beam splitter surface, which is arranged in the light path of the measurement light between the light source and the imaging optics and furthermore in the light path of the measurement light, which has been reflected by a measurement object after passing through the imaging optics, between the imaging optics and the spectrometer. The housing of the distance sensor furthermore contains a first diaphragm, which is arranged in the light path between the light source and the beam splitter surface, and a second diaphragm, which is arranged in the light path between the beam splitter surface and the spectrometer. The first diaphragm and the second diaphragm are arranged mirror-symmetrically with respect to the beam splitter surface. According to the invention, the measurement light propagates as a free beam inside the housing. The beam splitter surface, the first diaphragm and the second diaphragm are furthermore fastened together on a carrier which has an isotropic thermal expansion coefficient.

Whereas in distance sensors known from EP 2 667 152 B1, which was mentioned in the introduction, the measurement light is guided at least partially in optical fibers, in the distance sensor according to the invention the measurement light propagates entirely as a free beam inside the housing. The measurement tight can therefore be folded multiple times in all spatial directions in a very small space with the aid of reflecting surfaces, so that very small housing dimensions (for example 65×45×110 mm) and a correspondingly low weight of less than 400 g can be achieved.

Since the thermal dissipation is problematic for such densely packed optical elements, the first diaphragm and the second diaphragm are fastened together on a carrier which has an isotropic thermal expansion coefficient. If deformation of the carrier occurs as a result of a temperature change, the mirror-symmetrical arrangement of the diaphragms on the common carrier has the effect, because of its isotropic thermal expansion coefficient, that the optical paths between beam splitter surface and the diaphragms always vary uniformly. The optical conjugation between the diaphragms is therefore maintained almost fully irrespective of the temperature. Consequently, in the event of temperature changes, which are not fully avoidable because of the compact design, a significant impairment of the measurement accuracy can no longer take place.

The beam splitter surface is the surface of a beam splitter, at which surface an incident tight beam is split into two sub-beams. Usually, the splitting takes place by intensity, although in principle splitting according to polarization states may also be envisaged. In the case of beam splitter cubes, which consist of two prisms that are cemented to one another with the aid of a resin, the beam splitter surface is one of the mutually adjacent hypotenuse surfaces of the prisms, which carries a metallic or dielectric coating. This coating establishes the intensity ratio between the transmitted and reflected beam. In the case of beam splitter plates, the beam splitter surface is the outer surface of the plate, on which the light is incident and is partially reflected. Beam splitter cubes are preferred over beam splitter plates because multiple reflections, additional astigmatism and coma may occur in the case of beam splitter plates when they are struck by a divergent beam. Film splitters, which consist of a membrane a few micrometers thick and which forms the beam splitter surface, may also be envisaged as beam splitters. The membrane may for example consist of nitrocellulose, and is usually tensioned in a planar fashion in a carrier frame. The prisms, glass plates or carrier frames of such beam splitters are therefore likewise to be regarded as part of the carrier on which the diaphragms are arranged, and must therefore likewise have an at least approximately isotropic thermal expansion coefficient.

Usually, the carrier comprises an e.g. plate-shaped carrier element, on which a beam splitter comprising the beam splitter surface, the first diaphragm and the second diaphragm are fastened. This carrier element may also be constructed in several parts. The diaphragms may respectively be an opaque disk which has a diaphragm opening. Since such a diaphragm opening has a non-negligible axial extent, it may be advantageous for the first diaphragm and the second diaphragm each to comprise a plate, which carries a light-absorbing or reflecting coating that has a diaphragm opening. The diaphragm opening is very small, and typically has a diameter of between 10 μm and 50 μm. The coating may, for example, consist of chromium and be very thin.

In one exemplary embodiment, the plates are fastened on support elements, which are in turn fastened on the carrier element. The support elements should also be made of the same material.

With a view to the least possible temperature dependency, it is favorable for the carrier element, the support elements and the plates fastened thereon all to consist of the same material, or consist of materials which are different but have the same thermal expansion coefficient.

An additional carrier element, on which the beam splitter and the diaphragms are fastened, may be omitted if the beam splitter is configured as a beam splitter cube. Then, the prisms of which the beam splitter cube consists themselves form a carrier which ensures the desired distance of the diaphragms from the beam splitter surface. The diaphragms are then carried directly by outer surfaces of the two prisms. To this end, the relevant outer surfaces of the prisms, apart from the diaphragm opening, may be coated so as to be absorbent or reflecting. It is favorable for the measurement light to strike the beam splitter surface as a divergent ray bundle, because in this way less stray light enters the spectrometer and the measurement accuracy is improved, at least for measurement objects which reflect only little measurement light because of a low reflection coefficient or an oblique object surface.

Preferably, the imaging optics comprise an objective, which is fastened replaceably on a part of the housing, the measurement light coming from the direction of the light source entering the objective as a collimated ray bundle. A replaceable objective makes it possible to use objectives with different focal lengths and therefore to adapt the measurement distance to the specific measurement task. Since the measurement light coming from the beam splitter as a collimated ray bundle enters the objective, the requirements for the precision of the coupling of the objective to the rest of the housing are reduced.

In one exemplary embodiment, the spectrometer contains a detector line, a reflective diffraction grating, and spectrometer optics which image the second diaphragm onto the detector line. The spectrometer optics are arranged in the light path of the measurement light in such a way that the measurement light passes through them before and after reflection at the diffraction grating. Because of this double pass through the spectrometer optics, the required installation space can be reduced further. Nevertheless, it is possible to use high-quality spectrometer optics consisting of a plurality of lenses, which image the second diaphragm sharply onto the detector line and therefore ensure high signal strengths.

Preferably, the housing comprises an automatic changeable coupling, with which the housing can be fastened automatically on a holder of a coordinate measuring machine. The advantages of the very small and lightweight distance sensor can then be employed for use in a coordinate measuring machine. The small and lightweight distance sensor may also, independently of coordinate measuring machines, advantageously be used for all measurement tasks in which a small size and a low weight of the distance sensor are important.

BRIEF DESCRIPTION OF THE DRAWINGS

Exemplary embodiments of the invention will be explained in more detail below with the aid of drawings, in which.

DESCRIPTION OF PREFERRED EXEMPLARY EMBODIMENTS

Figure 1:
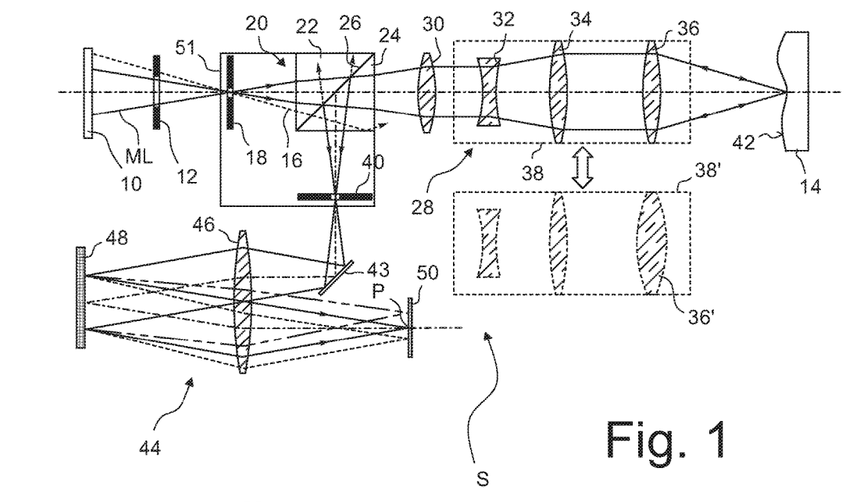
FIG. 1 shows the beam path in a distance sensor according to the invention in a simplified meridional section.

FIG. 1 shows, in a simplified meridional section, the beam path of a distance sensor according to the invention, denoted overall by S, according to a first exemplary embodiment. At the top left in FIG. 1, the number 10 denotes a light source which is configured in order to generate polychromatic measurement light ML. Polychromatic refers to light which is not monochromatic and therefore does not consist only of light of a single wavelength. The spectrum of the polychromatic measurement light ML may be continuous or discrete.

In the exemplary embodiment represented, the light source 10 used is a white light LED to generate a continuous spectrum between about 400 nm and 720 nm. The white light LED emits the measurement light ML uniformly over its entire planar light exit surface.

The white light LED may be mounted on a special thermal bridge which dissipates the heat loss from the rear side of the LED to an adjacent housing wall.

Arranged behind tight source 10 in the light path, there is an aperture 12, with which the angle of the measurement light cone is limited. The aperture 12 prevents entry of the measurement light into the subsequent beam path which cannot be focused onto the measurement object 14 to be measured, but which, without an aperture 12, would lead as a result of scattering or undesired multiple reflections to stray light which impairs the measurement accuracy. Indicated by way of example in FIG. 1 is a stray light beam 16, the propagation of which is prevented by the aperture 12.

The measurement light ML subsequently passes through a first diaphragm 18, the structure of which will be explained in more detail below with reference to FIG. 2. The measurement light ML passing through the diaphragm 18 divergently strikes a beam splitter cube 20, which consists in the known way of two prisms 22, 24 that are cemented to one another along their hypotenuse surfaces with the aid of a resin layer. In contrast to the beam splitter plate shown in FIG. 5, the beam splitter cube 20 does not cause any problems such as multiple reflections, additional astigmatism and coma in the case of a divergent beam. In the exemplary embodiment shown, the beam splitter cube 20 is configured in such a way that the majority of the measurement light ML passes through the beam splitter surface 26 without reflection and strikes imaging optics 28, which in the exemplary embodiment represented consist of four lenses. A first lens 30 has a positive refracting power and collimates the incident divergent measurement light ML. A second lens 32 has a negative refracting power and widens the measurement light ML. A third lens 34 again has a positive refracting power and collimates the incident measurement light ML. A fourth lens 36 focuses the incident collimated measurement light ML in its focal plane.

Whereas the lenses 30 and 32 have a negligibly small longitudinal chromatic aberration, and are preferably aspherical, a material with a high dispersion has been selected for the third lens 34 and the fourth lens 36 so that the two lenses 34, 36 have a large longitudinal chromatic aberration. As an alternative thereto, the lenses 34 and 36 may also be configured as diffractive lenses as is known for instance from EP 2 500 685 A1. As a result of the longitudinal chromatic aberration, the different spectral components of the measurement light ML are focused at different distances by the fourth lens 36. The imaging optics 28 are in this case optimized in such a way that a small, sharp focal point is formed for all wavelengths within a sizeable wavelength range, the focal point being arranged successively along the optical axis. In the case of normal chromatically uncorrected optics, conversely, small, sharp focal points are generally obtained only in for a small wavelength range, whereas the light of other wavelengths is concentrated only in fairly large unfocused spots.

The second, third and fourth lenses 32, 34 and 36 are combined in an objective 38, which is fastened replaceably on a housing part of the distance sensor S by means of a screw thread. Indicated by dashed lines below the objective 38 in FIG. 1, there is a replacement objective 38' with which the objective 38 can be replaced. Here, it is assumed that the fourth lens 36' of the replacement objective 38' has a higher refracting power than the fourth lens 36 of the objective 38. The replacement objective 38' therefore has shorter focal length than the objective 38. By replacing the objective 38, the working distance at which the measurement object 14 is to be arranged relative to the objective 38 (or vice versa) can therefore be adapted to the respective measurement task. Since the measurement light ML enters the objective 38 while being collimated, a slight transverse offset does not have a significant effect on the optical imaging. This reduces the requirements for the accuracy of the connecting flange with which the objective 38 is fastened on the rest of the housing.

Measurement light ML reflected by a surface 42 of the measurement object 14 is received by the imaging optics 28 and directed back onto the beam splitter cube 20. The reflected measurement light ML is partially reflected at the beam splitter surface 26. The reflected component passes through a second diaphragm 40, which is in optically conjugate position with respect to the surface 42 of the measurement object 14. The imaging optics 28 therefore image the first diaphragm 18 via an intermediate image on the surface 42 of the measurement object 14 onto the second diaphragm 40. The two diaphragms 18, 40 are therefore optically conjugate.

The measurement light ML passing through the diaphragm 40 travels via a folding mirror 43 into a spectrometer 44, which in this case comprises only spectrometer optics 46 indicated by a lens, a reflective diffraction grating 48 and a detector line 50 of photosensitive detector pixels.

The second diaphragm 40 and the detector line 50 lie in the focal plane of the spectrometer optics 46, so that, after the first pass through the spectrometer optics 46, the measurement light ML strikes the reflective diffraction grating 48 while being collimated. After a further pass through the spectrometer optics 46, the measurement light ML deflected by the reflective diffraction grating 48 is focused by the spectrometer optics 46 onto the detector line 50. The spectrometer optics 46 therefore image the second diaphragm 40 onto the detector line 50.

As already mentioned above, the measurement light ML enters the beam splitter cube 20 as a divergent ray bundle.

This is advantageous because the amount of stray light that enters the spectrometer 44 is thereby reduced. Specifically, a small part (typically around 1%) of the incident measurement light ML is always reflected at the rear-side plane surface, i.e. the one facing towards the measurement object 14. This measurement light reflected in the beam splitter cube 20 is reflected by the beam splitter surface 26 as stray light in the direction of the spectrometer 44. In the case of an axially parallel beam path, this stray light could then fully enter the spectrometer through the second diaphragm 40 via a converging lens which is then required, and interfere with the measurement of the spectrometer. But because the measurement light in this case enters the beam splitter cube 20 as a divergent ray bundle, only a very small part of this stray light is directed by the beam splitter surface 26 onto the opening of the second diaphragm 40; the rest of the stray light is blocked by the second diaphragm 40.

Since the measurement light ML strikes the rear-side plane surface of the beam splitter cube 20 divergently, the stray light bundle reflected in the direction of the spectrometer 44 is greatly widened when it strikes the second diaphragm 40. Only a very small part of this stray light can therefore enter the spectrometer and contribute to an interfering noise background.

The distance measurement is in this case carried out according to the confocal chromatic measurement principle known per se. Only measurement light ML of a very particular wavelength is focused by the imaging optics 28 into a plane in which the surface 42 of the measurement object 14 lies. A part of this measurement light is reflected by the surface 42, and focused by the imaging optics 28 onto the second diaphragm 40 in such a way that it can pass through the latter. Although light of other wavelengths is likewise reflected at the surface 42 of the measurement object 14, only a very small part of it can pass through the second diaphragm 40 since it is not focused into the second diaphragm 40 by the imaging optics 28.

Essentially only measurement light ML which has a very particular wavelength can therefore enter the spectrometer 44; the other wavelengths fall off significantly in intensity. Since the diffraction angle at the reflective diffraction grating 48 depends on the wavelength, the measurement light of this wavelength is deviated in a particular direction and focused by the spectrometer optics 46 at a point P which lies on the detector line 50. The other components of the measurement light ML, which are significantly weaker in intensity, are diffracted in other directions and focused by the spectrometer optics 46 at other positions on the detector line 50, as is indicated in FIG. 1 by dashed and dotted lines. By evaluating the intensities recorded at the pixels of the detector line 50, it is therefore possible to determine the wavelength of the measurement light ML which has been focused accurately by the lenses 34, 36 onto the surface 42 of the measurement object 14. Since the relationship between the wavelength and the focal length of the chromatically uncorrected lenses 34, 36 is known, the distance to the surface 42 of the measurement object can be derived directly from the recorded wavelengths.

In the distance sensor S shown in FIG. 1, its individual optical elements are represented without frames or holders. As explained in more detail below, the optical elements are arranged spatially very close together, so that heat which is generated, in particular, by the light source 10 and the detector line 50 can easily be transferred to the frames and holders of the optical elements.

In this context, the arrangement of the two diaphragms 18, 40 is particularly critical. Since the openings in the diaphragms 18, 40 must be very small for a high lateral measurement resolution (the diameter preferably lies between 10 μm and 50 μm), even very small temperature-induced relative displacements between the diaphragms 18, 40 lead to it no longer being possible for the imaging optics 28 to image the first diaphragm 18 exactly onto the second diaphragm 40.

Figure 2:
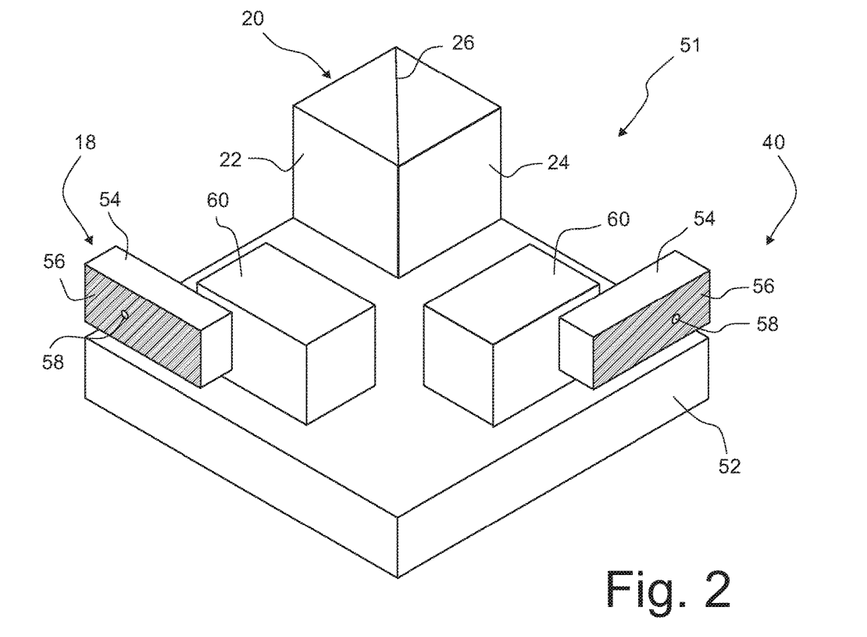
FIG. 2 shows a perspective representation of a miniaturized beam splitter module having two diaphragms, which is arranged in the housing of the distance sensor.

In order to prevent impairments of the measurement accuracy due to unavoidable temperature variations, the beam splitter cube 20 together with the diaphragms 18, 40 is fastened on a common plate-shaped carrier element 52, as is shown in the perspective representation of FIG. 2. The carrier element 52 has an isotropic thermal expansion coefficient and, with the components carried by it, forms a diaphragm module 51 which is preferably constructed in several parts for alignment purposes and can be fastened on, or integrated into, a housing wall of the distance sensor S.

The first diaphragm 18 comprises a transparent cuboid plate 54, which carries a light-absorbing coating 56. The coating 56 has a diaphragm opening 58, through which the measurement light can pass through the diaphragm 18. The plate 54 is fastened on a likewise cuboid support element 60, which is fastened on a surface of the carrier element 52. Since the light-absorbing coating 56 is very thin, the diaphragm opening 58 has a negligible axial extent so that the diaphragm effect does not depend on the angle of incidence of the incident light.

The plates 54 are bonded firmly on the support elements 60 with the aid of an adhesive which cures under UV light, and are carefully aligned with one another before the adhesive bonding. The optical axes defined by the diaphragm openings 58 of the diaphragms 18, 40 must intersect in the beam splitter cube 20 at a point on the beam splitter surface 26, so that the imaging optics 28 can image the diaphragm openings 58 of the diaphragms 18, 40 precisely on one another.

The second diaphragm 40 is constructed identically. The diaphragm plane of the second diaphragm, in which the absorbent coating 56 extends and which is oriented perpendicularly to the optical axis, is oriented at a right angle to the diaphragm plane of the first diaphragm 18. The beam splitter cube 20 is fastened on a corner of the carrier element 52. In FIGS. 1 and 2, it can be seen that the diaphragms 18, 40 are arranged mirror-symmetrically with respect to the beam splitter surface 26.

In the exemplary embodiment represented, all components of the diaphragm module 51, apart from the light-absorbing coatings 56, consist of quartz glass. Nevertheless, Zerodurt®, which has an almost vanishingly small thermal expansion coefficient at the operating temperature of 20° C. which is usual for high-precision measurements, may also be envisaged. Since the light source 10 and the detector line 50 have a power consumption in the range of a few watts overall, however, such large temperature increases may occur that the optical elements shown in FIG. 2, and above all their frames and holders, thermally expand.

Since the diaphragms 18, 40 are arranged on the carrier element 52 mirror-symmetrically with respect to the beam splitter surface 26 of the beam splitter cube 20, the relative arrangement between the diaphragms 18, 40 and the beam splitter surface 20 do not change in the event of a thermally induced length expansion. In such an expansion, the image of the first diaphragm 18 therefore still lies exactly on the optical axis of the second diaphragm 40, and is merely-displaced somewhat along the optical axis, although this is not problematic because of the small numerical aperture of the measurement light ML and the consequent large depth of focus.

Figure 3:
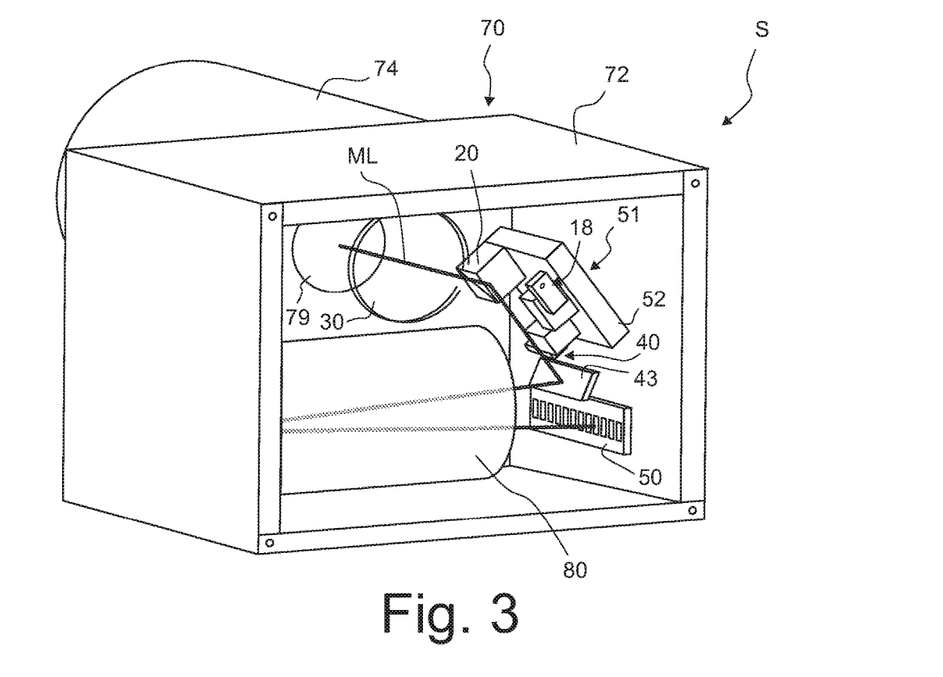
FIG. 3 shows a simplified perspective representation of the distance sensor with the rear housing wall removed.
Figure 4:
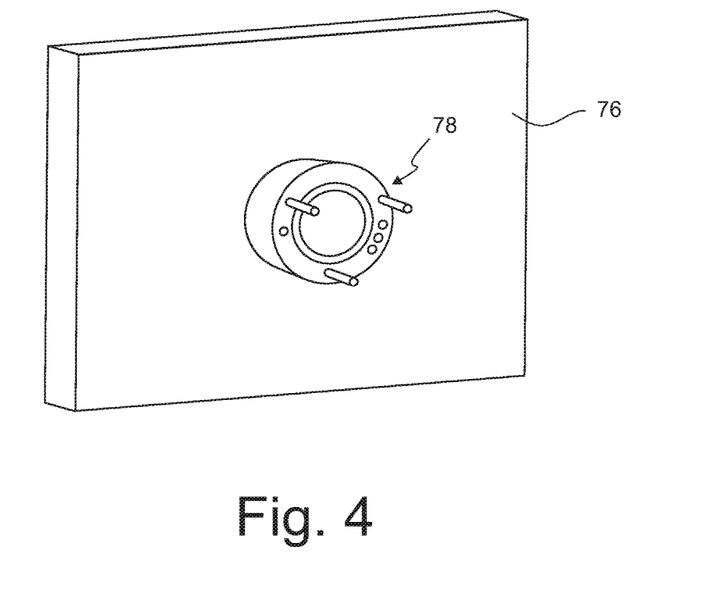
FIG. 4 shows a simplified perspective representation of the rear housing wall.

FIG. 3 shows the distance sensor S according to the invention in a very simplified perspective representation. All optical elements shown in FIGS. 1 and 2 are contained in a housing 70, which comprises a main housing part 72 that can be seen in FIG. 3, a removable housing part 74 that receives the objective 38, and a rear housing wall 76 that is represented only in FIG. 4. The latter comprises an automatic changeable coupling 78 for coupling the distance sensor S to a holder of a coordinate measuring machine (not represented).

In the first housing part 72, the diaphragm module 51, the first lens 30 of the imaging optics 28, a housing 80 of the spectrometer optics 46, the folding mirror 43 and the detector line 50 can be seen. On the front side of the housing, a cutout 79 can be seen, through which the measurement light ML leaves the main housing part 72 to enter the replaceable objective 38. Other parts, such as evaluation electronics or a voltage supply, are not represented in FIG. 3 for the sake of clarity. Furthermore, frames and other holders for the optical elements have been omitted here.

A single axial measurement light beam ML is represented in the perspective representation of FIG. 3. It can be seen that the folding mirror 43 has deviated the measurement light ML, after it has passed through the second diaphragm 40 on the diaphragm module 51, out of the beam plane in such a way that it propagates approximately parallel to the longitudinal direction of the housing 70. By interaction f the beam splitter surface 26 and the folding mirror 43, the measurement light ML reflected by the measurement object 14 is therefore folded in three spatial directions, which allows an extremely compact structure. The distance sensor S is depicted approximately on a scale of 1:1 in FIG. 3, so that the dimensions shown there approximately correspond to the actual dimensions of the distance sensor S.

Figure 5:
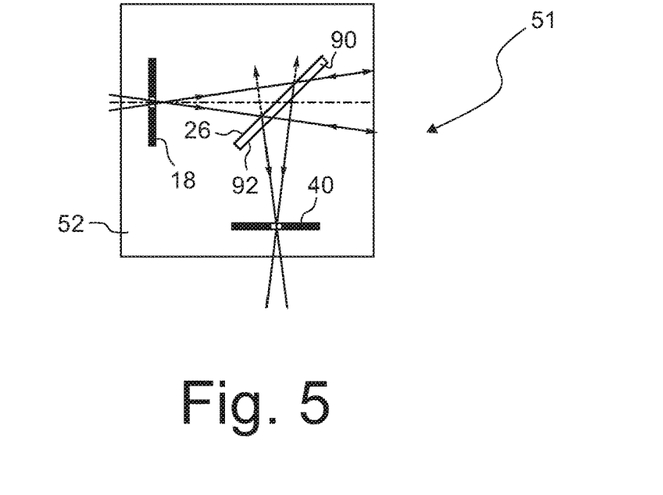
FIG. 5 shows a detail of the beam path in a distance sensor according to the invention in which a beam splitter plate is used as the beam splitter.

FIG. 5 shows a detail of the beam path for another exemplary embodiment of a distance sensor S according to the invention. In contrast to the first exemplary embodiment, a beam splitter plate 90 instead of a beam splitter cube is used as the beam splitter. The first plane surface of the beam splitter plate 90, facing towards the left in FIG. 5, forms the beam splitter surface 26 at which the incident measurement light ML is partially reflected and with respect to which the diaphragms 18, 40 are arranged mirror-symmetrically. Usually, this plane surface is provided with a dielectric coating with which the ratio between transmitted and reflected light can be set. The second plane surface 92, facing towards the right in FIG. 5, is provided with an antireflection coating so that measurement light ML that can pass through the first plane surface is not reflected at the second plane surface.

Figure 6:
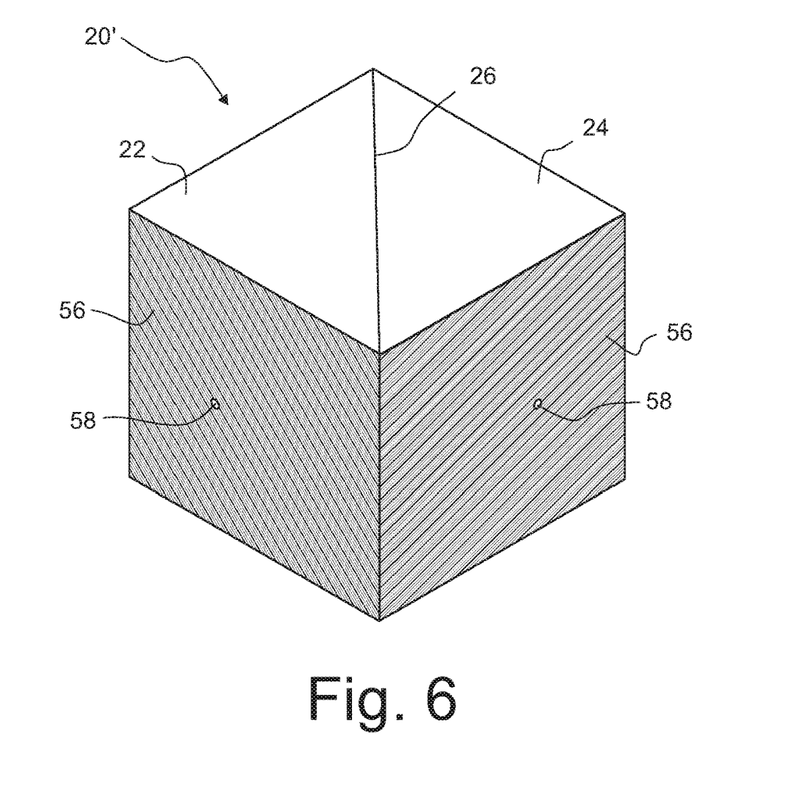
FIG. 6 shows a perspective representation of a beam splitter cube, the outer surfaces of Which carry diaphragms.

FIG. 6 shows a perspective representation of a beam splitter cube 20' according to a third exemplary embodiment. The beam splitter cube 20' is in principle constructed precisely the same way as the beam splitter cube 20 shown in FIG. 2, and therefore likewise comprises two prisms 22, 24 connected to one another, between which the beam splitter surface 26 extends. In contrast to the first exemplary embodiment, however, the light-absorbing coatings 56 provided with diaphragm openings 58, which coatings form the diaphragms 18, 40, are carried not by separate plates but directly by outer surfaces of the beam splitter cube 20'. In this way, the prisms 22, 24 of the beam splitter cube themselves form a carrier for the diaphragms 18, 40, which has an isotropic thermal expansion coefficient.

The invention claimed is:

1. A chromatic confocal distance sensor, having a housing in which the following are arranged:
    a light source, which is configured in order to generate polychromatic measurement light,
    imaging optics, which have a longitudinal chromatic aberration,
    a spectrometer,
    a planar beam splitter surface, which is arranged in the light path of the measurement light between the light source and the imaging optics and furthermore in the light path of the measurement light, which has been reflected by a measurement object after passing through the imaging optics, between the imaging optics and the spectrometer,
    a first diaphragm, which is arranged in the light path between the light source and the beam splitter surface,
    a second diaphragm, which is arranged in the light path between the beam splitter surface and the spectrometer,
    the first diaphragm and the second diaphragm being arranged mirror-symmetrically with respect to the beam splitter surface, wherein
    the measurement light propagates as a free beam inside the housing,
    the beam splitter surface, the first diaphragm and the second diaphragm are fastened together on a carrier which has an isotropic thermal expansion coefficient,
    the first diaphragm and the second diaphragm each comprise a transparent plate that has a light absorbing or light reflecting coating, wherein only the coating, but not the plate has a diaphragm opening, and wherein
    the sensor is configured to measure a distance to the measurement object based on an output of the spectrometer.

2. The distance sensor according to claim 1, wherein the beam splitter surface is part of a beam splitter, and the carrier comprises a carrier element on which the beam splitter, the first diaphragm and the second diaphragm are fastened.

3. The distance sensor according to claim 1, wherein the diaphragm opening has a diameter of between 10 µm and 50 µm.

4. The distance sensor according to claim 1, wherein the plates are fastened on support elements, which are in turn fastened on the carrier element.

5. The distance sensor according to claim 4, wherein the plates of the diaphragms, the support elements and the carrier element all consist of the same material, or consist of materials which are different but have the same thermal expansion coefficient.

6. The distance sensor according to claim 1, wherein the beam splitter is configured as a beam splitter cube.

7. The distance sensor according to claim 1, wherein the carrier comprises two prisms connected to one another, between which the beam splitter surface is arranged and which form a beam splitter cube, outer surfaces of the beam splitter cube carrying the diaphragms.

8. The distance sensor according to claim 1, wherein the measurement light strikes the beam splitter surface as a divergent ray bundle.

9. The distance sensor according to claim 1, wherein the imaging optics comprise an objective, which is fastened replaceably on a part of the housing, and the measurement light coming from the direction of the light source enters the objective as a collimated ray bundle.

10. The distance sensor according to claim 1, wherein the spectrometer contains a detector line, a reflective diffraction grating, and spectrometer optics which image the second diaphragm onto the detector line, and in that the spectrometer optics are arranged in the light path of the measurement light in such a way that the measurement light passes through them before and after reflection at the diffraction grating.

11. The distance sensor according to claim 1, wherein the housing comprises an automatic changeable coupling, with which the housing can be fastened automatically on a holder of a coordinate measuring machine.

12. The distance sensor according to claim 1, wherein an aperture for stopping out stray light is arranged in the light path between the light source and the first diaphragm.

13. A chromatic confocal distance sensor, having a housing in which the following are arranged:
- a light source, which is configured in order to generate polychromatic measurement light,
- imaging optics, which have a longitudinal chromatic aberration,
- a spectrometer,
- a planar beam splitter surface, which is arranged in the light path of the measurement light between the light source and the imaging optics and furthermore in the light path of the measurement light, which has been reflected by a measurement object after passing through the imaging optics, between the imaging optics and the spectrometer,
- a first diaphragm, which is arranged in the light path between the light source and the beam splitter surface,
- a second diaphragm, which is arranged in the light path between the beam splitter surface and the spectrometer, the first diaphragm and the second diaphragm being arranged mirror-symmetrically with respect to the beam splitter surface, wherein the measurement light propagates as a free beam inside the housing, the beam splitter surface, the first diaphragm and the second diaphragm are fastened together on a carrier which has an isotropic thermal expansion coefficient and a planar mounting surface, the first diaphragm and the second diaphragm each comprise a transparent plate that has a light absorbing or light reflecting coating, at least one transparent plate is fastened on a support element having a first planar surface and a second planar surface that is inclined to the first planar surface, wherein, before the at least one transparent plate is glued on the first planar surface, the transparent plate is displaceable on the first planar surface along two orthogonal directions for adjustment purposes, and wherein, before the support element is glued on the planar mounting surface of the carrier, the support element is displaceable on the carrier along two orthogonal directions for adjustment purposes, and wherein the sensor is configured to measure a distance to the measurement object based on an output of the spectrometer.

* * * * *